UNITED STATES PATENT OFFICE.

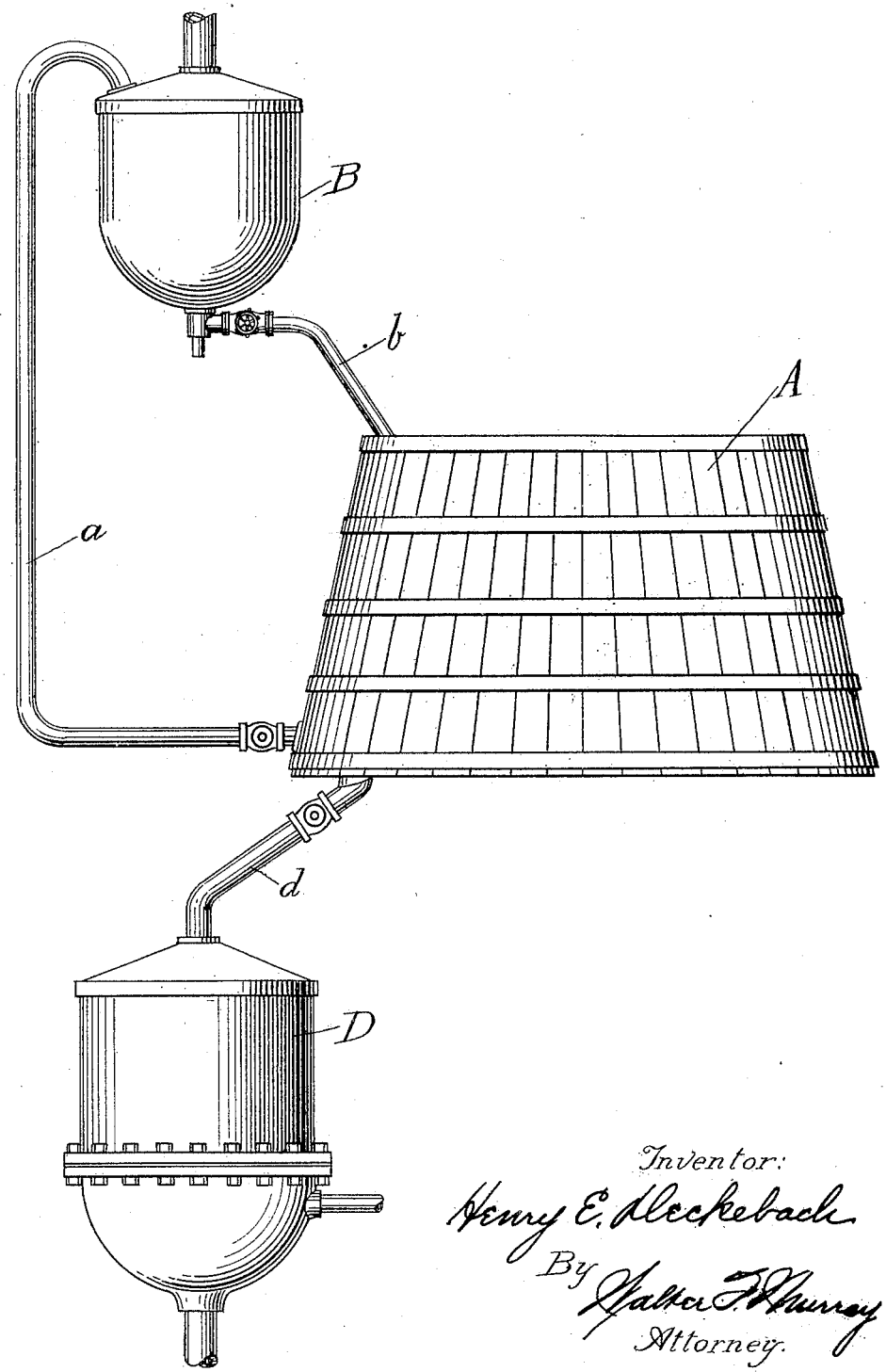

HENRY E. DECKEBACH, OF CINCINNATI, OHIO.

MASHING PROCESS.

1,374,191. Specification of Letters Patent. Patented Apr. 12, 1921.

Application filed September 20, 1919. Serial No. 325,143.

*To all whom it may concern:*

Be it known that I, HENRY E. DECKEBACH, a citizen of the United States of America, and resident of Cincinnati, in the county of Hamilton and State of Ohio, have invented a new and useful Improvement in Mashing Processes, of which the following is a specification.

My invention relates to the class of mashing process in which to the mash prepared from malt there is added a gelatinized quantity of maize or rice, termed grits.

In this process, it has been customary to keep the grits at a boiling temperature in a vessel termed a converter, for about a half an hour or so until the starch of the grits has been converted and at the same time to bring the mashing process in a mash tun almost to completion, then just before the taps are set, for carrying the wort to the kettle, to run the material from the converter in upon the top of the material in the mash tun.

The objections to this process of mashing are: that the boiling material coming in upon the surface of the mash kills or deleteriously affects the diastase of the malt and that it tends to increase the production of under dough, which is then carried in an unconverted state into the kettle from which it passes into the fermenting tubs, where it contaminates the yeast.

It is the object of my invention to prevent the killing of the diastase, to convert most of the starch into sugar and to change any under dough which may form, into an unfermentable sugar and to carry such as cannot be converted in a finely divided state to the top of the contents of the mash tun from which it may be removed with the spent malt.

In the accompanying drawing, there is illustrated in side elevation an apparatus by means of which my process may be performed.

In carrying out my process a ground malt mixed with the usual proportion of water is heated in the mash tun A to about 37 degrees C. At the same time the grits composed of corn or rice are brought to a boiling temperature, of about 100 degrees C. in the converter B. Then the material in the mash tun is pumped from the bottom thereof through pipe A upon the top of the material in the converter B, and at the same time the material from the converter is led from the bottom thereof through pipe $b$ in upon top of the material in the mash tun. A circulation of material from the bottom of the mash tun in upon top of the converter and from the bottom of the converter in upon top of the mash tun is maintained until all of the starch is converted into sugar. Or if a higher degree of dextrin is desired, the circulation may be continued until the material has been brought to a temperature of about 75 degrees C.

After the starch has been converted, the material is led from the bottom of mash tun A through pipe $d$ to the kettle D.

Any unconverted malt will be retained at the top of the mash tun and may be removed with the spent malt.

What I claim is:

1. A mashing process which consists of heating ground malt and water in a mash tun, simultaneously heating grits and water in a converter, instituting a circulation of the materials from the mash tun into the converter and from the converter into the mash tun, maintaining the circulation until the starch is converted and then discharging the material from the mash tun.

2. A process of mashing consisting of heating the material in a mash tun to approximately 37 degrees C., heating the material in a converter to approximately 100 degrees C., conveying the material from the bottom of the mash tun to the top of the converter, conveying the material from the bottom of the converter to the top of the mash tun, and maintaining circulation until the starch has been converted.

In testimony whereof, I have hereunto subscribed my name this 18th day of September, 1919.

HENRY E. DECKEBACH.